United States Patent
Honma et al.

(10) Patent No.: US 9,939,063 B2
(45) Date of Patent: Apr. 10, 2018

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Tomoaki Honma, Isehara (JP); Yuta Suzuki, Sagamihara (JP); Itaru Shinohara, Atsugi (JP); Hiroshi Sekiya, Atsugi (JP); Hiromu Ogino, Yamato (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/324,880

(22) PCT Filed: May 27, 2015

(86) PCT No.: PCT/JP2015/065206
§ 371 (c)(1),
(2) Date: Jan. 9, 2017

(87) PCT Pub. No.: WO2016/006347
PCT Pub. Date: Jan. 14, 2016

(65) Prior Publication Data
US 2017/0211701 A1    Jul. 27, 2017

(30) Foreign Application Priority Data
Jul. 9, 2014  (JP) ................................. 2014-141744

(51) Int. Cl.
*F16H 59/72* (2006.01)
*F16H 61/662* (2006.01)
(Continued)

(52) U.S. Cl.
CPC ....... *F16H 61/66272* (2013.01); *F16H 59/44* (2013.01); *F16H 59/72* (2013.01); *F16H 2059/683* (2013.01)

(58) Field of Classification Search
CPC ..... F16H 59/44; F16H 59/72; F16H 61/66272
See application file for complete search history.

(56) References Cited

U.S. PATENT DOCUMENTS 4,962,678 A  * 10/1990 Murano .................. F16H 59/72
                                                         474/22
5,249,483 A     10/1993 Iizuka
(Continued)

FOREIGN PATENT DOCUMENTS

JP          05-126238 A      5/1993
JP         2000-213638 A     8/2000
(Continued)

OTHER PUBLICATIONS

U.S. Appl. No. 15/324,897, filed Jan. 9, 2017, Honma et al.
U.S. Appl. No. 15/324,885, filed Jan. 9, 2017, Honma et al.

*Primary Examiner* — Edwin A Young
(74) *Attorney, Agent, or Firm* — Foley & Lardner LLP

(57) ABSTRACT

A control device for a continuously variable transmission includes: a line pressure generating means configured to generate a line pressure; a pilot valve configured to supply a pilot pressure regulated so as not to exceed a first predetermined pressure when the line pressure exceeds the first predetermined pressure; a control means configured to control solenoid valves by the pilot pressure, and thereby to generate belt clamping forces; an oil vibration sensing means configured to sense an oil vibration; and a line pressure increase means configured to increase the line (Continued)

pressure to be greater than the first predetermined pressure when the oil vibration sensing means senses the oil vibration.

8 Claims, 5 Drawing Sheets

(51) Int. Cl.
*F16H 59/44* (2006.01)
*F16H 59/68* (2006.01)

(56) References Cited

U.S. PATENT DOCUMENTS

| | | | |
|---|---|---|---|
| 5,598,335 A * | 1/1997 | You | F16H 61/0213 |
| | | | 477/120 |
| 2001/0039470 A1* | 11/2001 | Fessler | F16H 61/66259 |
| | | | 701/51 |
| 2009/0234546 A1 | 9/2009 | Inoue et al. | |
| 2011/0048552 A1* | 3/2011 | Dohi | F16H 59/72 |
| | | | 137/511 |
| 2013/0136623 A1 | 5/2013 | Hwang et al. | |

FOREIGN PATENT DOCUMENTS

| | | |
|---|---|---|
| JP | 2002-227984 A | 8/2002 |
| JP | 2005-003065 A | 1/2005 |
| JP | 2008-089146 A | 4/2008 |
| JP | 2012-219947 A | 11/2012 |
| JP | 2013-113437 A | 6/2013 |

* cited by examiner

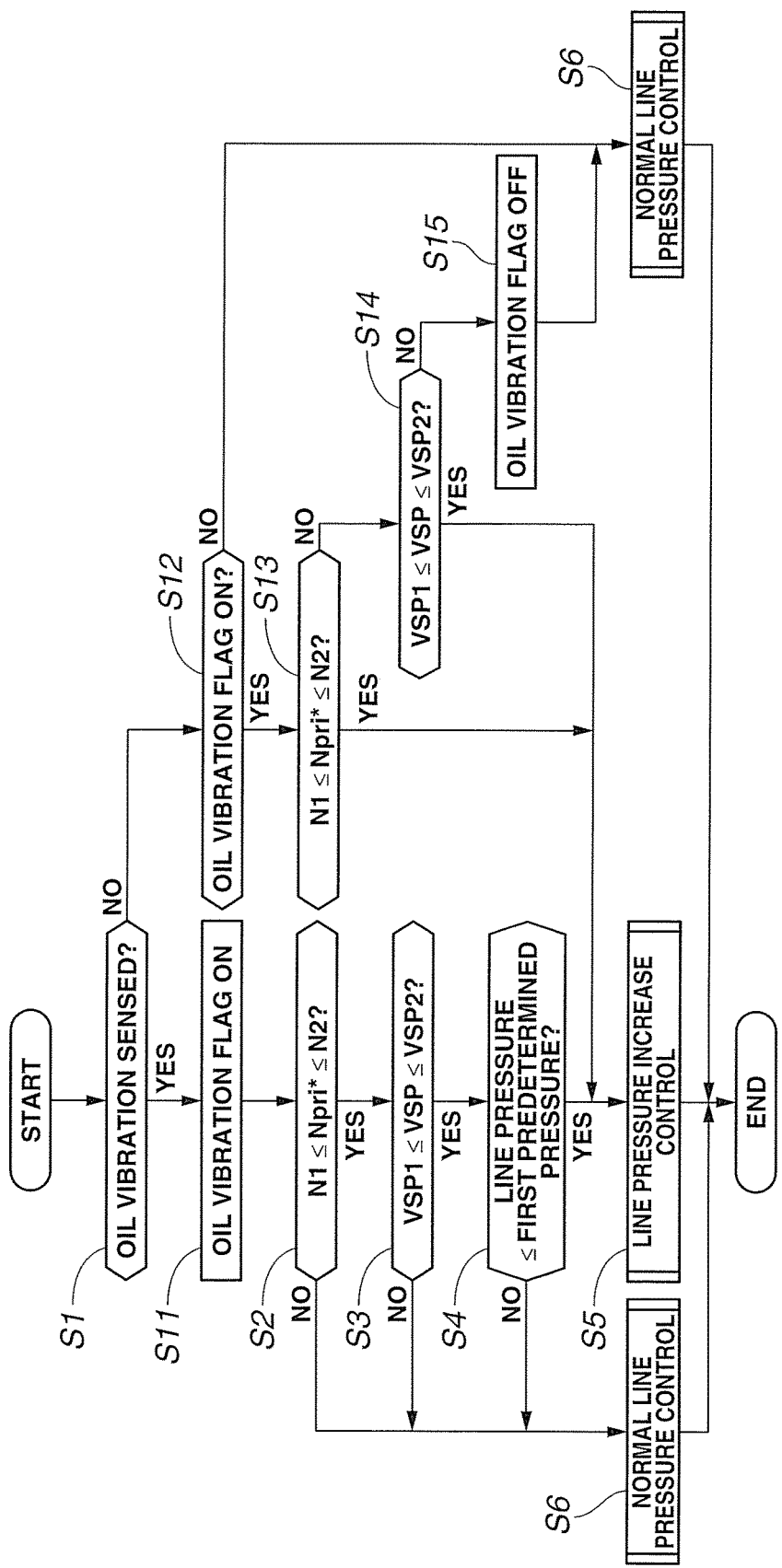

ABSTRACT

CONTROL DEVICE FOR CONTINUOUSLY VARIABLE TRANSMISSION

TECHNICAL FIELD

This invention relates to a control device for a continuously variable transmission mounted on a vehicle.

BACKGROUND ART

Conventionally, a patent document 1 discloses an art to sense an amplitude and a cycle (period) based on the hydraulic pressure detection value, to calculate a hydraulic pressure correction amount based on a maximum amplitude during the sensed cycle, and to correct to increase a target supply hydraulic pressure of a clamping pressure.

However, the target supply hydraulic pressure of the clamping pressure is corrected to be increased. Accordingly, the hydraulic pressure pulsation cannot be decreased although it is possible to prevent the slippage of the belt even when the clamping force is decreased due to the hydraulic pressure pulsation. It is not possible to suppress the variation of the vehicle behavior due to the hydraulic pressure pulsation. Consequently, the driver may feel the unnatural feeling.

PRIOR ART DOCUMENT

Patent Document

Japanese Patent Application Publication No. 2012-219947

SUMMARY OF THE INVENTION

It is an object to provide a control device for a continuously variable transmission devised to solve the above-mentioned problems, to suppress the variation of the behavior of the vehicle, and to suppress the unnatural feeling to the driver.

For attaining the above-described object, the control device for the continuously variable transmission which includes a belt wound around a primary pulley and a secondary pulley, and which is shifted by controlling belt clamping forces of the primary pulley and the secondary pulley, the control device comprising includes: a line pressure generating means configured to generate a line pressure; a pilot valve configured to supply a pilot pressure regulated so as not to exceed a first predetermined pressure when the line pressure exceeds the first predetermined pressure; a control means configured to control solenoid valves by the pilot pressure, and thereby to generate the clamping forces; an oil vibration sensing means configured to sense an oil vibration; and a line pressure increase means configured to increase the line pressure to be greater than the first predetermined pressure when the oil vibration sensing means senses the oil vibration.

Accordingly, when the oil vibration is sensed, the line pressure is controlled to be greater than the first predetermined pressure. Consequently, even when the oil vibration is generated in the line pressure, the pilot valve excludes the excessive hydraulic pressure of the varying line pressure. It is possible to stably supply the first predetermined pressure. Therefore, it is possible to decrease the variation of the control hydraulic pressure with the oil vibration since the other solenoid valves are controlled based on the stable pilot pressure. Accordingly, it is possible to prevent the mutual increase within the hydraulic pressure, and to suppress the unnatural feeling to the driver.

BRIEF DESCRIPTION OF DRAWINGS

FIG. 7 is a flow chart showing a line pressure increase control in the first embodiment.

DESCRIPTION OF EMBODIMENTS

First Embodiment

Figure 1:
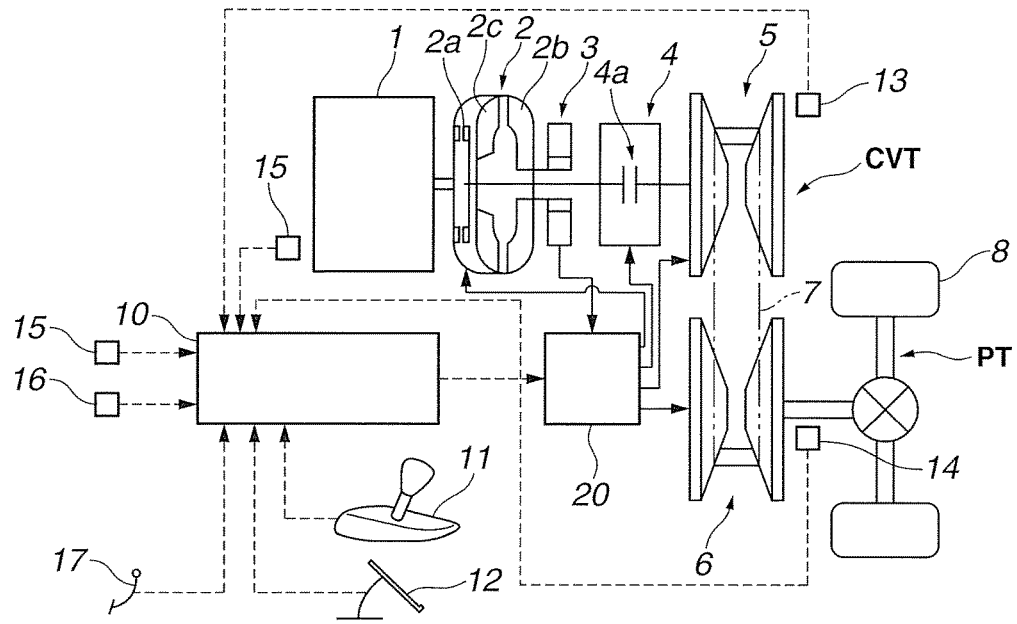
FIG. 1 is a system diagram showing a control device of a continuously variable transmission according to a first embodiment.

FIG. 1 is a system diagram showing a control device of a continuously variable transmission according to a first embodiment. A vehicle according to the first embodiment includes an engine 1 which is an internal combustion engine, and the continuously variable transmission. A driving force is transmitted through a differential gear to tires 8 which are driving wheels. A power transmitting path connected from a belt type continuously variable transmission mechanism CVT to the tires 8 is referred to as a power train PT.

The continuously variable transmission includes a torque converter 2, an oil pump 3, and a forward/rearward movement switching mechanism 4, and the belt type continuously variable transmission mechanism CVT. The torque converter 2 includes a pump impeller 2b connected to the engine 1, and arranged to rotate as a unit with a driving claw configured to drive the oil pump 3; a turbine runner 2c connected to an input side of the forward/rearward movement switching mechanism 4 (an input shaft of the belt type continuously variable transmission mechanism CVT); and a lock-up clutch 2a arranged to integrally connect the pump impeller 2b and the turbine runner 2c. The forward/rearward movement switching mechanism 4 includes a planetary gear mechanism, and a plurality of clutches 4a. The forward/rearward movement switching mechanism 4 is arranged to switch the forward movement and the rearward movement in accordance with the engagement state of the clutch 4a. The belt type continuously variable transmission mechanism CVT includes a primary pulley 5 connected to an output side of the forward/rearward movement switching mechanism 4 (an input shaft of the continuously variable transmission); a secondary pulley 6 arranged to rotate as a unit with driving wheels; a belt 7 wound around the primary pulley 5 and the secondary pulley 6 to transmit the power; and a control valve unit 20 arranged to supply control pressures to hydraulic actuators.

A control unit 10 receives a range position signal (hereinafter, the range position signal is described as a P range, an R range, an N range, or a D range) from a shift lever 11 which is arranged to select a range position by an operation of a driver, an accelerator pedal opening degree signal (hereinafter, APO) from an accelerator pedal opening degree sensor 12, a brake pedal ON/OFF signal from a brake switch 17, a primary pulley pressure signal from a primary pulley pressure sensor 15 arranged to sense a hydraulic pressure of the primary pulley 5, a secondary pulley pressure signal from a secondary pulley pressure sensor 16 arranged to sense a pressure of the primary pulley 6, a primary pulley rotation speed signal Npri from a primary pulley rotation speed sensor 13 arranged to sense a rotation speed of a primary pulley 5, a secondary pulley rotation speed signal Nsec from a secondary pulley rotation speed sensor 14 arranged to sense a rotation speed of the secondary pulley 6, and an engine speed Ne from an engine speed sensor 15 arranged to sense an engine speed. Besides, the primary pulley rotation speed signal Npri is identical to the turbine rotation speed by the engagement of the clutch 4a in a case of the D range. Accordingly, hereinafter, the primary rotation speed signal Npri is also described as the turbine rotation speed Nt.

The control unit 10 controls the engagement state of the clutch 4a in accordance with the range position signal. That is, the control unit 10 is configured to control the clutch 4a to the disengagement state in case of the P range or the N range. The control unit 10 is configured to output a control signal to the control valve unit 20 in case of the R range so that the forward/rearward movement switching mechanism 4 outputs the reverse rotation, and thereby to engage the rearward clutch (or the brake). Moreover, the control unit 10 is arranged to output a control signal to the control valve unit 20 in case of the D range so that the forward/reverse movement switching mechanism 4 rotates as a unit to output the positive rotation, and thereby to engage the forward clutch 4a. Furthermore, the control unit 10 calculates a vehicle speed VSP based on the secondary rotation speed Nsec.

A shift map to attain an appropriate fuel economy state in accordance with a traveling state is set within the control unit 10. A target transmission gear ratio (corresponding to a predetermined transmission gear ratio) is set based on the APO signal and the vehicle speed VSP based on this shift map. It is controlled by the feed forward control based on the target transmission gear ratio. The actual transmission gear ratio is sensed based on the primary pulley rotation speed signal Npri and the secondary pulley rotation speed signal Nsec. The feedback control is performed so that the set target transmission gear ratio and the actual transmission gear ratio become identical to (corresponds to) each other. That is, the target primary rotation speed Npri* is calculated from the current vehicle speed VSP and the target transmission gear ratio. The transmission gear ratio is controlled so that the turbine rotation speed Nt (the engine speed at the engagement of the lock-up clutch 2a) becomes the target primary rotation speed Npri*. Moreover, the hydraulic pressure commands of the pulleys and the engagement pressure command of the lock-up clutch 2a are outputted to the control valve unit 20 by the feedback control, so that the hydraulic pressures of the pulleys and the lock-up pressure difference of the lock-up clutch 2a are controlled. Besides, in the first embodiment, a line pressure sensor is not provided within the control valve unit 20. When the line pressure is sensed, the line pressure is sensed from the command signal to a line pressure solenoid valve 30 (described later). However, the line pressure sensor may be provided to sense the line pressure.

An oil vibration sensing section is provided within the control unit 10. The oil vibration sensing section is arranged to sense the oil vibration based on the signals from the first primary pulley pressure sensor 15 and the second pulley pressure sensor 16. First, the voltage signals sensed by the primary pulley pressure sensor 15 and the secondary pulley pressure sensor 16 are converted to the hydraulic pressure signal. DC components (the variation components according to the control command) are eliminated by band bass filter operation. The only vibration components are extracted. Then, the amplitudes of the vibration components are calculated. In a case where a state in which the amplitude of the primary pulley pressure or the secondary pulley pressure is equal to or greater than the predetermined amplitude is continued during a predetermined time period, the oil vibration flag is brought to the ON state. On the other hand, when a state in which the amplitude is lower than the predetermined amplitude is continued during the predetermined time period, the oil vibration flag is brought to the OFF state.

Figure 2:
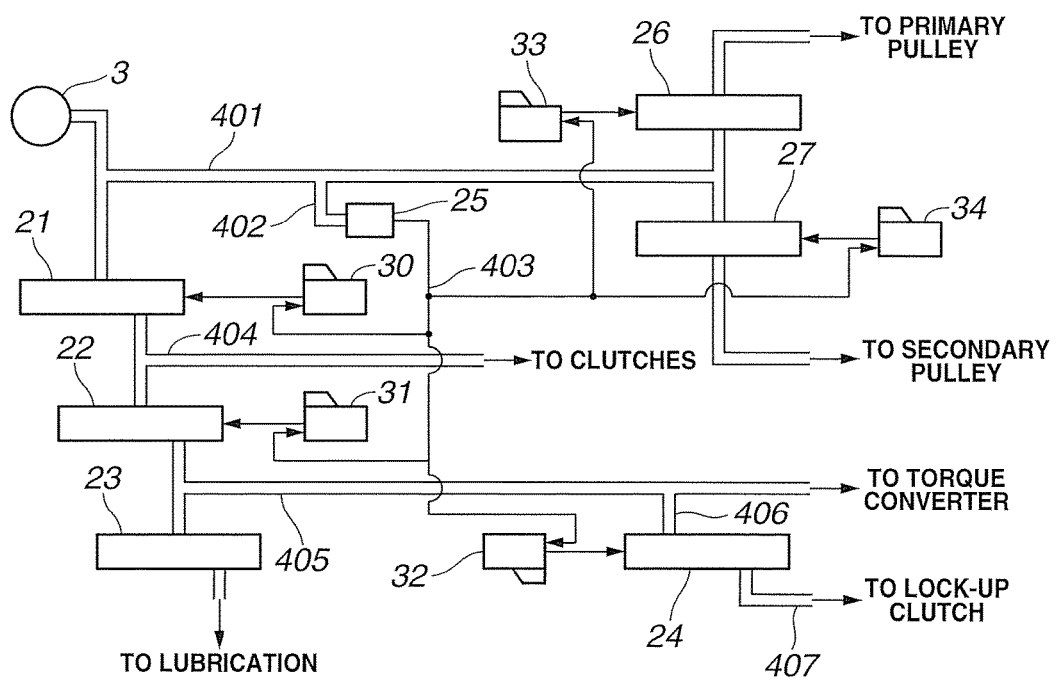
FIG. 2 is a hydraulic circuit diagram showing an outline (skeleton) within a control valve unit according to the first embodiment.

FIG. 2 is a hydraulic circuit diagram showing an outline within the control valve unit in the first embodiment. The pump pressure discharged from the oil pump 3 driven by the engine 1 is discharged to the hydraulic passage 401, and regulated to the line pressure by the pressure regulator valve 21. The hydraulic passage 401 is supplied, as the source pressures for the pulley hydraulic pressure, to the pulleys. A primary regulator valve 26 is connected to the hydraulic passage 401, and that pressure is regulated to the primary pulley pressure by the primary regulator valve 26. Similarly, a secondary regulator valve 27 is connected to the hydraulic passage 401, and that pressure is regulated to the secondary pulley pressure by the secondary regulator valve 27. A pilot valve 25 is provided in a hydraulic passage 402 bifurcated from the hydraulic passage 401. The pilot valve 25 generates a previously set first predetermined pressure (corresponding to a predetermined pressure in claim 1) from the line pressure, and outputs the first predetermined pressure to the pilot pressure hydraulic passage 403. With this, the source pressure of the signal pressures outputted from the solenoid valves (described later) are generated. Besides, when the line pressure is equal to or smaller than the first predetermined pressure, the line pressure and the pilot pressure are outputted as the same pressure.

The hydraulic passage 404 is connected to the pressure regulator valve 21, and that pressure is regulated to the engagement pressure of the clutch 4a by the clutch regulator valve 22. The hydraulic passage 405 is connected to a torque converter regulator valve 23, and that pressure is regulated to the converter pressure of the torque converter 2 by the torque converter regulator valve 23. The hydraulic passage 406 bifurcated from the hydraulic passage 405 is connected to a lock-up valve 24, and that pressure is regulated to the lock-up pressure of the lock-up clutch 2a by the lock-up valve 24. In the lock-up clutch 2a, the lock-up control is performed by the lock-up pressure difference which is a pressure difference between the converter pressure and the lock-up pressure. In this way, the clutch regulator valve 22 is provided on the downstream side of the pressure regulator valve 21. The torque converter regulator valve 23 is provided on the more downstream side. With this, even when the excessively large torque is inputted from the engine, the belt slippage of the belt type continuously variable transmission CVT is prevented by the slippage of the lock-up clutch 2a and the slippage of the clutch 4a.

The pilot pressure hydraulic passage 403 includes a line pressure solenoid valve 30 configured to control the line pressure; a clutch pressure solenoid valve 31 configured to control the clutch engagement pressure; a lock-up solenoid valve 32 configured to control the lock-up pressure; a primary solenoid valve 33 configured to control the primary pulley pressure; and a secondary solenoid valve 34 configured to control the secondary pulley pressure. The solenoid valves control the energization states of the solenoids based on the control signal outputted from the control unit 10 to supply the signal pressure by using the pilot pressure as the source pressure to the valves, so as to control the pressure regulation states of the valves.

In this case, problems when the oil vibration is generated within the control valve unit 20 are explained. As described above, various valves are provided within the control valve unit 20. The pressure regulator valve 21 is a valve arranged to regulate the highest hydraulic pressure discharged from the oil pump 3. Accordingly, the pressure regulator valve 21 is easy to receive the influence of the pump pulsation. A spool and so on constituting the pressure regulator valve 21 is vibrated in accordance with design specifications of valve diameter, an inertia, and so on, so that the line pressure may be vibrated (hereinafter, described as oil vibration). Moreover, the line pressure is set in accordance with the accelerator pedal opening degree APO. Accordingly, the line pressure is set to the low value when the accelerator pedal opening degree APO is small. The line pressure is set to the large value when the accelerator pedal opening degree APO is large.

Figure 3:
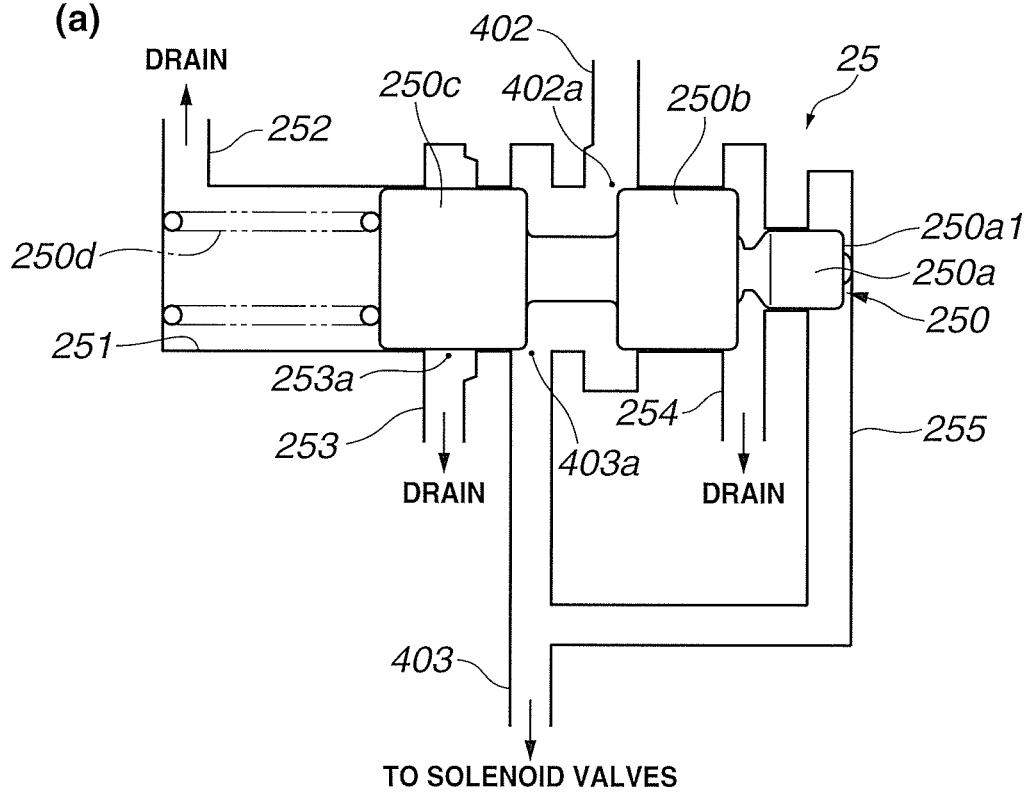
FIG. 3 are schematic views showing a construction of a pilot valve in the first embodiment.
Figure 3:
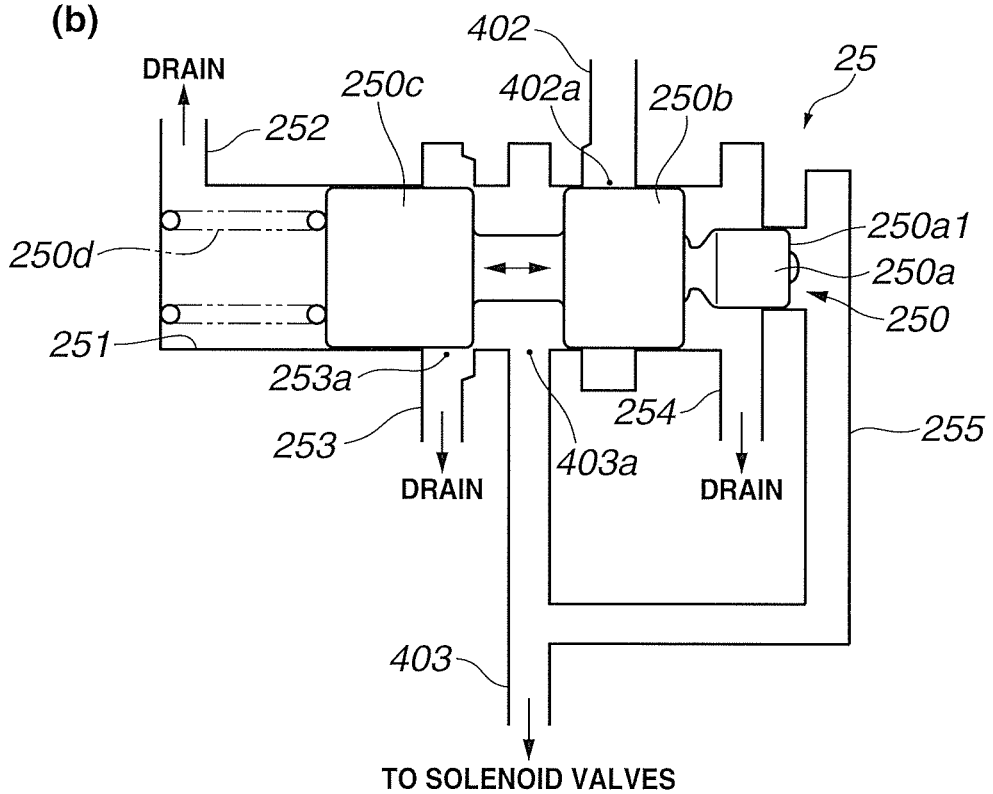

FIG. 3 are schematic views showing a structure of the pilot valve in the first embodiment. FIG. 3(a) shows an initial state before the generation of the hydraulic pressure. FIG. 3(b) shows a state when the pilot pressure is regulated. The components are illustrated by using the position relationship shown in FIG. 3(a). The pilot valve 25 includes a valve receiving hole 251 formed within the control valve unit; a spool valve 250 received within the valve receiving hole 251; and a spring 250d arranged to urge the spool valve 250 in one direction. The spool valve 250 includes a first spool 250a including a feedback pressure land portion 250a1 arranged to receive the hydraulic pressure supplied from a pilot pressure feedback circuit 255; a second spool 250b arranged to regulate an opening degree of the line pressure port 402a; and a third spool 250c arranged to regulate connection states with the pilot pressure port 403a and the drain port 253a.

The spring 250d is received between a bottom surface of the valve receiving hole 251 and the third spool 250c. The spring 250d urges on the pilot pressure feedback circuit 255's side. The spring 250d urges the spool valve 250 by the previously set predetermined spring set load. A drain circuit 252 is connected to the valve receiving hole 251 in which this spring 250d is received. Moreover, a drain circuit 254 is connected to a portion between the first spool 250a and the second spool 250b. When the spool valve 250 is moved, the drain circuit 254 allows a volume variation of a space between the second spool 250b and the valve receiving hole 251. In this way, the drain circuits are connected to the both sides of the spool valve 250. With this, it is possible to ensure the smooth operation of the spool valve 250.

When the line pressure is smaller than the first predetermined pressure which is the pilot pressure maximum value, it does not overcome the predetermined spring set load of the spring 250d, so that the spool valve 250 is not actuated. In this case, the hydraulic pressure is directly supplied from the line pressure port 402a to the pilot pressure port 403a. Consequently, the line pressure and the pilot pressure are the same. Next, when the line pressure is equal to or greater than the first predetermined pressure which is the pilot pressure maximum value, the spool valve 250 is started to be actuated as shown in FIG. 3(b). That is, the force generated by acting the hydraulic pressure of the pilot pressure feedback circuit 255 to the feedback pressure land portion 250a1 becomes greater than the predetermined spring set load. With this, the spool valve 250 is moved in the leftward direction of FIG. 3 (the spring 250d's side). With this, the opening of the line pressure port 402a becomes narrow by the second spool 250b. The line pressure is decreased by the orifice effect. The hydraulic pressure supplied to the pilot pressure feedback circuit 255 is also lowered. Moreover, when the line pressure is extremely high, the pilot pressure port 403a and the drain port 253a are connected by the movement of the third spool 250c. The line pressure supplied so that it becomes the pilot pressure is largely decreased from the drain circuit 253. In this way, the spool valve 250 is actuated by the pilot pressure supplied from the feedback circuit 255, so that the pilot pressure is regulated so as to have the first predetermined pressure which is the maximum value.

Figure 4:
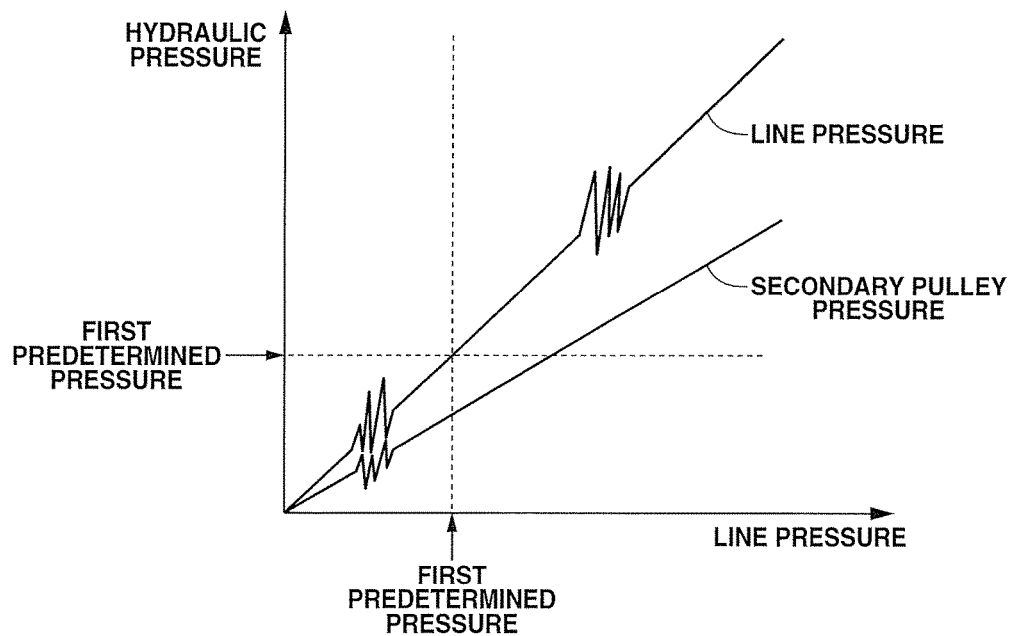
FIG. 4 is a characteristic view showing a relationship among a line pressure, a pilot pressure, and a secondary pulley pressure in the continuously variable transmission according to the first embodiment.

FIG. 4 is a characteristic view showing a relationship among the line pressure, the pilot pressure, and the secondary pulley pressure in the continuously variable transmission according to the first embodiment. A lateral axis represents the line pressure. A longitudinal axis represents the hydraulic pressure. The line pressure becomes liner relationship. As illustrated in the hydraulic circuit structure of FIG. 3, the pilot pressure is a hydraulic pressure regulated based on the line pressure. The secondary pulley pressure is a hydraulic pressure regulated based on the line pressure. In a region in which the line pressure is greater than the first predetermined pressure, the line pressure>the pilot pressure is satisfied. Even when the oil vibration is generated in the line pressure, the small influence is acted to the pilot pressure. The signal pressure outputted from the secondary solenoid valve 34 is difficult to receive the influence. Accordingly, there are few elements vibrated within the control valve. Consequently, the oil vibration is not increased due to the mutual interference within the control valve.

On the other hand, in a region where the line pressure is equal to or smaller than the first predetermined pressure, the line pressure=the pilot pressure is satisfied. At this time, when the oil vibration is generated in the line pressure, the pilot pressure is also vibrated. Moreover, the secondary solenoid valve 34 arranged to regulate the line pressure to the secondary pulley pressure receives the influence of the vibrated pilot pressure. Accordingly, the signal pressure discharged from the secondary regulator valve 27 is influenced by the vibration of the pilot pressure. When the secondary pulley pressure is controlled, the influence of the oil vibration is received. In this way, when the oil vibration is generated in the region where the line pressure is equal to or smaller than the first predetermined pressure, the elements which are vibrated within the control valve are increased. Consequently, the oil vibration is increased by the mutual interference (interaction) within the control valve.

Figure 5:
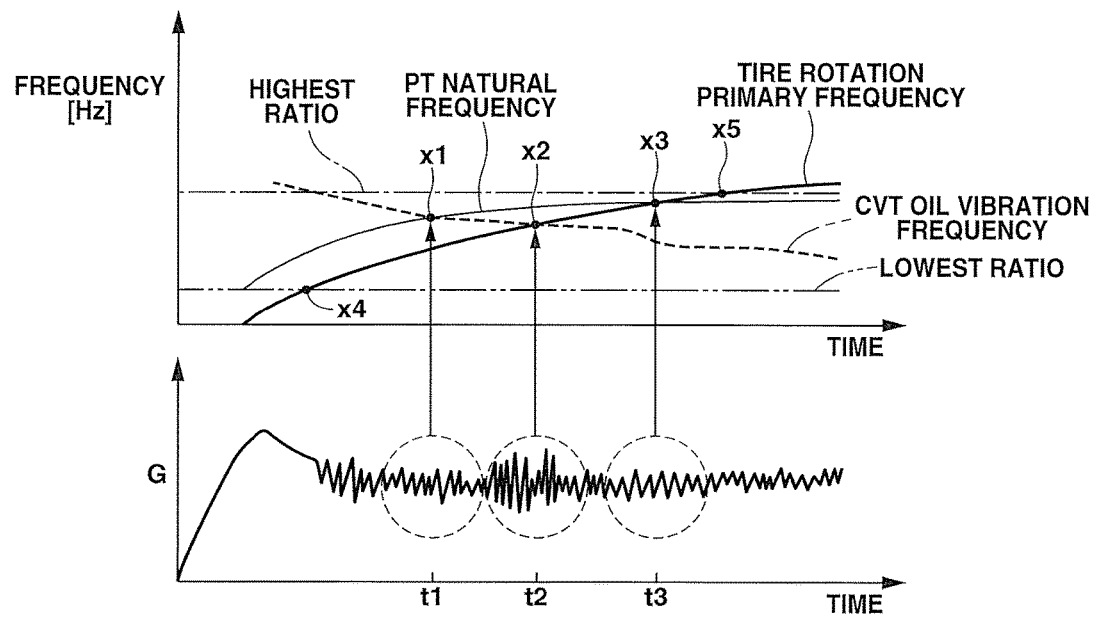
FIG. 5 is a time chart in a case where an oil vibration is generated when a vehicle travels in a state where the line pressure is lower than a first predetermined pressure.

FIG. 5 is a time chart when the oil vibration is generated when the vehicle travels in a state where the line pressure is smaller than the first predetermined pressure. In FIG. 5, a bold solid line is a tire rotation primary vibration frequency. A thin solid line is a natural frequency of the power train PT. A bold dotted line is an oil vibration frequency. One dot chain line is a natural frequency of the power train PT when the belt type continuously variable transmission CVT is the highest ratio. Two dot chain line is a natural frequency of the power train PT when the belt type continuously variable transmission CVT is the lowest ratio. In this case, the tire rotation primary frequency represents a primary frequency of the rotation vibration which is generated when the tires 8 are rotated, and which is easy to be felt by the occupant. Moreover, the natural frequency of the power train PT represents an elastic torsion natural frequency which the power train PT transmits the power through a shaft and so on to the tires 8. Besides, this natural frequency is varied to the high frequency side when the belt type continuously variable transmission mechanism CVT is the High side, and varied to the low frequency side when the belt type continuously variable transmission mechanism CVT is the Low side.

As shown in FIG. 5, the vibration of the line pressure influences the pilot pressure. The oil vibration frequency (for example, the line pressure frequency) within the control valve, and the tire rotation primary frequency and the natural frequency of the power train PT may be resonated. With this, the forward/rearward acceleration vibration of the vehicle may be increased. Therefore, in this first embodiment, the line pressure is increased when the oil vibration flag is in the ON state, when the line pressure is equal to or smaller than the first predetermined pressure, and when the resonance of the various vibrations may be generated.

As shown in FIG. 5, a point of intersection of the oil vibration frequency of the line pressure (represented by the CVT oil vibration frequency in FIG. 5) and the natural frequency of the power train PT is represented by x1 (a second traveling state). A point of intersection of the oil vibration frequency and the tire rotation primary frequency is represented by x2 (a first traveling state). A point of intersection of the natural frequency of the power train PT and the tire rotation primary frequency is represented by x3 (a third traveling state). A point of intersection of the tire rotation primary frequency and the Lowest rate natural frequency is represented by x4. A point of intersection of the tire rotation primary frequency and the Highest rate natural frequency is x5. Besides, these frequencies are determined by their design specifications (design specification of the pressure regulator valve, the pump characteristics, design specification of the power train PT, tire diameter, and so on).

As shown in the vibration state of the forward/rearward acceleration G of FIG. 5, when the vehicle is started and gradually accelerated, the transmission gear ratio of the belt type continuously variable transmission mechanism CVT is upshifted from the Lowest side to the Highest side based on the vehicle speed VSP and the accelerator opening degree APO. The natural frequency of the power train PT is increased in accordance with this upshift. The tire rotation primary frequency is also increased in accordance with the increase of the vehicle speed VSP. Then, the forward/rearward acceleration G is vibrated by the influence of the oil vibration after the lock-up clutch 2a is engaged.

At time t1, the natural frequency of the power train PT and the oil vibration frequency are easy to be resonated near the intersection point x1. The forward/rearward accelerator vibration is easy to be generated.

Moreover, at time t2, the tire rotation primary frequency and the oil vibration frequency are easy to be resonated near the intersection point t2. Furthermore, these are near the natural frequency of the power train PT. Accordingly, these and the natural frequency of the power train PT are easy to be resonated.

Moreover, at time t3, the tire rotation frequency and the natural frequency of the power train PT are easy to be generated at the intersection point x3. By this influence, the tire rotation primary frequency and the natural frequency of the power train PT may be resonated with the oil vibration frequency.

Figure 6:
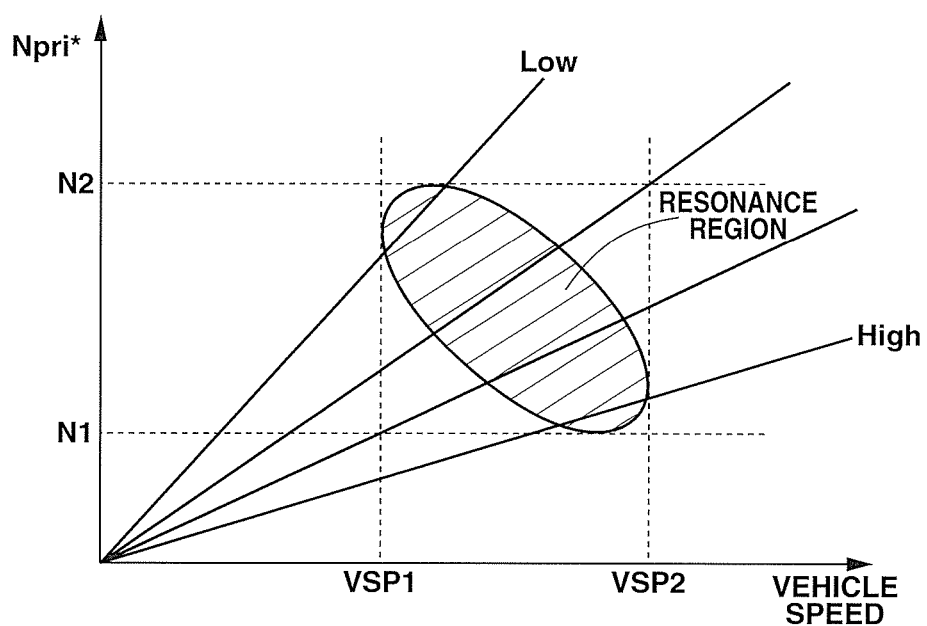
FIG. 6 is a characteristic view showing a region in which a natural frequency of a power train PT and a tire rotation primary frequency are resonated when the oil vibration is generated in a state where the line pressure is lower than the first predetermined pressure.

FIG. 6 is a characteristic view showing a region in which the natural frequency of the power train PT and the tire rotation primary frequency are resonated when the oil vibration is generated in a state where the line pressure is smaller than the first predetermined pressure. It has been discovered that the resonance region near the intersection point x1 and the intersection point x2 exist in a region where the vehicle speed VSP is defined from VSP1 to VSP2, and in a region where the target primary rotation speed Npri* is defined from N1 to N2.

Accordingly, this traveling state which has the intersection point x1, x2 and x3, and which induces the resonance is specified by the regions of the target primary rotation speed Npri* and the vehicle speed VSP. The line pressure is increased to the predetermined pressure greater than the first predetermined pressure, in the region of the above-described target primary rotation speed Npri* and the above-described vehicle speed VSP when the oil vibration is sensed. With this, even when the oil vibration is generated in the line pressure, the line pressure becomes higher than the first predetermined pressure. Accordingly, it is possible to exclude the increase of the oil vibration due to the mutual interference within the control valve, and to suppress the resonance with the other vibration components. Besides, when the traveling state is determined based on the target primary rotation speed Npri* and the vehicle speed VSP, it may be determined, for example, by the traveling state including the intersection points x4 and x5. The intersection points x4 and x5 can be determined by the design specifications. The intersection points x4 and x5 can cover the entire region in which the natural frequency of the power train PT and the tire natural primary frequency may be resonated. This is because the region including these intersection points x4 and x5 causes the resonance due to the relationship between the oil vibration frequency, and the natural frequency of the power train PT and the tire rotation primary frequency.

FIG. 7 is a flowchart showing the line pressure increase control in the first embodiment.

At step S1, it is judged whether or not the oil vibration sensing flag is in the ON state. When the ON state is judged, the process proceeds to step S11. Otherwise, the process proceeds to step S12. At step S11, the oil vibration flag is brought to the ON state. Then, the process proceeds to step S2.

At step S2, it is judged whether or not the target primary rotation speed Npri* is within the predetermined rotation speed range (N$1 \leq$Npri*$\leq$N$2$). When the target primary rotation speed Npri* is within the predetermined rotation speed, the process proceeds to step S3. Otherwise, the process proceeds to step S6. At step S6, the normal line pressure control is performed. This predetermined rotation speed range is set based on the traveling state in which the above-described intersection points x1, x2, and x3 are included. Besides, by using the target primary rotation speed Npri*, it is possible to previously grasp the resonance range, and to attain the line pressure increase control with the higher response.

At step S3, it is judged whether or not the vehicle speed VSP is within the predetermined vehicle speed range (VSP$1 \leq$VSP$\leq$VSP$2$). When the vehicle speed VSP is within the predetermined vehicle speed range, the process proceeds to step S4. Otherwise, the process proceeds to step S6. At step S6, the normal line pressure control 6 is performed. This predetermined vehicle speed range is set based on the traveling state in which the above-described intersection points x1, x2, and x3 are included.

At step S4, it is judged whether or not the line pressure is equal to or smaller than the first predetermined pressure. When the line pressure is equal to or smaller than the first predetermined pressure, the process proceeds to step S5. At step S5, the line pressure increase control is performed. When the line pressure is greater than the first predetermined pressure, the process proceeds to step S6. At step S6, the normal line pressure control is performed. Besides, a value obtained by subtracting a pressure obtained in consideration of safety factor from the first predetermined pressure may be used in place of the first predetermined pressure. The first predetermined pressure is not limited to these. Besides, the first predetermined pressure is previously determined by the design specifications of the pilot valve 25. The line pressure can be sensed from the command signal to the line pressure solenoid 30. Accordingly, it is judged whether or not the line pressure is equal to or smaller than the predetermined pressure, by comparing the current command signal to the line pressure solenoid 30, and the predetermined stored value corresponding to the first predetermined pressure. Besides, in a case where the line pressure sensor and so on which is arranged to sense the lie pressure, these can be compared by using the line pressure sensor signal.

At step S5, the line pressure increase control is performed. That is, the line pressure is set to the second predetermined pressure which is greater than the first predetermined pressure. This second predetermined pressure is the value obtained by adding the third predetermined pressure which is obtained in consideration of the amplitude of the oil vibration that is previously obtained by the experiment and so on, and which becomes equal to or greater than the maximum amplitude of the oil vibration. With this, it is possible to further exclude the influence of the oil vibration to the pilot pressure, and to suppress the energy consumption without extremely increasing the line pressure.

At step S12, it is judged whether or not the oil vibration flag is in the ON state. When the oil vibration flag is in the ON state, the process proceeds to step S11. When the oil vibration flag is in the OFF state, the process proceeds to step S6. At step S6, the normal line pressure control is performed.

At step S13, it is judged whether or not the target primary rotation speed Npri* is within the predetermined rotation speed range (N1≤Npri*≤N2). When the target primary rotation speed Npri* is within the predetermined rotation speed range, the process proceeds to step S5 to continue the line pressure increase control. Otherwise, the process proceeds to step S14.

At step S14, it is judged whether or not the vehicle speed VSP is within the predetermined vehicle speed range (VSP1≤VSP≤VSP2). When the vehicle speed VSP is within the predetermined opening degree range, the process proceeds to step S5 to continue the line pressure increase control. Otherwise, the process proceeds to step S15.

At step S15, the oil vibration flag is set to the OFF state. The process proceeds to step S6 to perform the normal line pressure control.

In this way, it is possible to exclude the influence of the oil vibration by increasing the line pressure in the traveling state in which it is conceivable to include the intersection points x1, x2, and x3, when the oil vibration flag is in the ON state, and when the line pressure is smaller than the predetermined pilot pressure. With this, it is possible to suppress the resonance with the tire rotation primary frequency and the natural frequency of the power train PT, and to maintain the stable engagement state.

Moreover, it proceeds to the normal line pressure control to allow the decrease of the line pressure when it is confirmed that it proceeds to the region other than the resonance region, when the oil vibration flag is not sensed while the line pressure increase control is performed in the ON state of the oil vibration flag. In this way, even when the oil vibration is not sensed, the oil vibration may be generated again in the resonance region due to the decrease of the line pressure and so on. Accordingly, the line pressure increase control is continued. On the other hand, in a case where it is departed from the resonance region, the resonance is not generated. Accordingly, in this case, it is rapidly returned to the normal line pressure control. With this, it is possible to improve the fuel economy.

As described above, it is possible to attain following operations and effects in this embodiment. (1) In the belt type continuously variable transmission mechanism CVT which includes a belt 7 wound around the primary pulley 5 and the secondary pulley 6, and which is shifted by controlling the pulley hydraulic pressures (the belt clamping forces) of the primary pulley 5 and the secondary pulley 6, there are provided:

the oil pump 3 and the pressure regulator valve 21 (line pressure generating means) arranged to generate the line pressure;

the pilot valve 25 arranged to supply the pilot pressure regulated so as not to exceed the first predetermined pressure when the line pressure exceeds the first predetermined pressure;

the control unit 10 (the control means) configured to generate the pulley hydraulic pressures by controlling the solenoid valve by the pilot pressure;

the step S1 (the oil vibration sensing means) configured to sense the oil vibration; and the step S5 (the line pressure increase means) configured to increase the line pressure to be greater than the first predetermined pressure when the oil vibration is sensed by the step S1.

Accordingly, when the oil vibration is sensed, the line pressure is controlled to be greater than the first predetermined pressure. Accordingly, even when the oil vibration is generated in the line pressure, the pilot valve 25 excludes the excessive hydraulic pressure based on the relationship between the feedback hydraulic pressure and the spring 250d. Consequently, it is possible to stably supply the first predetermined pressure. Therefore, it is possible to decrease the variations of the other hydraulic actuators according to the oil vibration since the other solenoid valves are controlled based on the stable pilot pressure. Accordingly, it is possible to prevent the mutual increase of the oil vibrations within the hydraulic circuit, and to suppress the unnatural feeling to the driver.

(2) The control unit 10 is configured to increase the line pressure to be greater than the first predetermined pressure when the line pressure set in accordance with the traveling state is equal to or smaller than the first predetermined pressure at the point x2 of intersection (the first traveling state) at which the tire rotation primary frequency and the oil vibration frequency corresponds to each other.

Accordingly, in the normal line pressure control, the line pressure becomes greater than the first predetermined pressure in the first traveling state in which the tire rotation primary frequency and the oil vibration frequency corresponds to each other even when the line pressure is lower than the first predetermined pressure, and the pilot pressure is identical to the line pressure. Consequently, it is possible to increase the line pressure to be greater than the pilot pressure. Therefore, even when the oil vibration is generated in the line pressure, it is possible to decrease the influence on the pilot pressure, to decrease the elements vibrated within the control valve, and to suppress the increase of the oil vibration due the mutual interference. With this, even when the rotation primary frequency of the tire and the oil vibration frequency of the control valve correspond to each other, it is possible to suppress the resonance between the oil vibration frequency and the tire primary frequency. Accordingly, it is possible to suppress the unnatural feeling according to the behavior variation of the vehicle to the driver.

(3) The control unit 10 is configured to increase the line pressure to be greater than the first predetermined pressure when the line pressure is equal to or smaller than the first predetermined pressure at the point x1 of intersection (the second traveling state) at which the oil vibration frequency of the line pressure and the natural frequency of the power train PT (the torsion natural frequency between the continuously variable transmission and the tires.

Accordingly, even when the oil vibration is generated in the line pressure, it is possible to stably supply the first predetermined pressure without the influence on the pilot pressure. Consequently, it is possible to suppress the resonance with the natural frequency of the power train PT. Therefore, it is possible to suppress the unnatural feeling according to the variation and so on of the forward/rearward acceleration to the driver.

(4) The control unit 10 is configured to increase the line pressure to be greater than the predetermined pressure when the line pressure is equal to or greater than the first predetermined pressure at the point x3 of the intersection (the third traveling state) at which the rotation primary frequency of the tire and the natural frequency of the power train PT corresponds to each other.

Accordingly, even when oil vibration is generated in the line pressure, it is possible to stably maintain the engagement state of the lock-up clutch 2a without the influence on the pilot pressure. Consequently, even when the resonance of the primary rotation frequency of the tire and the natural frequency of the power train PT are generated, it is possible to suppress the resonance of that resonance and the oil vibration frequency. Therefore, it is possible to suppress the unnatural feeling according to the variation and so on of the forward/rearward acceleration to the driver.

(5) The control unit 10 is configured to increase the line pressure to be greater than the first predetermined pressure when the line pressure is smaller than the first predetermined pressure, and when the target primary rotation speed Npri* is within the predetermined rotation speed range including the point x2 of the intersection.

Accordingly, it is possible to specify the traveling state by the simple structure. Besides, it is optional to specify the traveling state by the points of the intersections x1 and x3, and also the points of the intersection x4 and x5, in addition to the point of the intersection x2.

(6) The control unit 10 is configured to increase the line pressure to be greater than the first predetermined pressure when the line pressure is equal to or smaller than the first predetermined pressure, and when the vehicle speed VSP is within the predetermined vehicle speed range including the point x2 of the intersection.

Accordingly, it is possible to specify the traveling state by the simple structure. Besides, it is optional to specify the traveling state by the points of the intersections x1 and x3, and also the points of the intersection x4 and x5, in addition to the point of the intersection x2.

(7) The control unit 10 is configured to finish the line pressure increase control to increase the line pressure to be greater than the first predetermined pressure, and to return to the line pressure according to the traveling state, when the line pressure is increased, when the oil vibration is not sensed, and when the target primary rotation speed Npri* is out of the range defined by N1 and N2 (out of the predetermined rotation speed range).

Accordingly, even when the oil vibration is not sensed, the oil vibration may be caused in the resonance region in accordance with the decrease of the line pressure. Accordingly, the line pressure increase control is continued in the resonance region. With this, it is possible to suppress the unnatural feeling to the driver. Moreover, when it is out of the resonance region, it is possible to avoid the generation of the resonance, and to decrease the line pressure. Accordingly, it is possible to improve the fuel consumption without providing the unnatural feeling to the driver.

(8) The control unit 10 is configured to finish the line pressure increase control to increase the line pressure to be greater than the first predetermined pressure, and to return to the line pressure according to the traveling state when the line pressure is increased, when the vehicle speed VSP is out of the range defined by VSP1 and VSP2 (out of the predetermined vehicle speed range.

Accordingly, even when the oil vibration is not sensed, the oil vibration may be caused in the resonance region in accordance with the decrease of the line pressure. Accordingly, the line pressure increase control is continued in the resonance region. With this, it is possible to suppress the unnatural feeling to the driver. Moreover, when it is out of the resonance region, it is possible to decrease the line pressure while avoiding the generation of the resonance. Consequently, it is possible to improve the fuel consumption without providing the unnatural feeling to the driver.

Hereinbefore, the present invention has been illustrated based on the embodiment. The present invention includes the other structures. For example, in the first embodiment, the regions of the target primary rotation speed Npri* and the vehicle speed VSP are the regions including the points of the intersections x1, x2, and x3. However, a region including at least x1 may be defined. A region including x1 and x2 may be defined.

Moreover, in the first embodiment, when the resonance region is specified, the line pressure increase control is performed when both of the condition of the target primary rotation speed Npri* and the condition of the vehicle speed VSP are satisfied. However, the line pressure increase control is performed when one of these conditions is satisfied. Furthermore, when it is shifted from the line pressure increase control to the normal line pressure control, it is shifted to the normal line pressure control when the both of the condition of the target primary rotation speed Npri* and the condition of the vehicle speed VSP are not satisfied. However, when one of these conditions is satisfied, it may be shifted to the normal lie pressure control.

Moreover, in the first embodiment, when the resonance region is specified, it is judged by using the target primary rotation speed Npri*. However, it is not limited to the target primary rotation speed Npri*. It is judged by using the actual primary rotation speed Npri.

The invention claimed is:

1. A control device for a continuously variable transmission which includes a belt wound around a primary pulley and a secondary pulley, and which is shifted by controlling belt clamping forces of the primary pulley and the secondary pulley, the control device comprising:
  a line pressure generating section configured to generate a line pressure;
  a pilot valve configured to supply a pilot pressure regulated so as not to exceed a first predetermined pressure when the line pressure exceeds the first predetermined pressure;
  a control section configured to generate a belt clamping pressure from the line pressure supplied as a source pressure of the belt clamping forces by controlling solenoid valves by the pilot pressure;
  an oil vibration sensing section configured to sense an oil vibration; and
  a line pressure increase section configured to increase the line pressure to be greater than the first predetermined pressure when the oil vibration sensing section senses the oil vibration in a state where the line pressure is lower than the first predetermined pressure.

2. The control device for the continuously variable transmission as claimed in claim 1, wherein the line pressure increase section is configured to increase the line pressure to be greater than the first predetermined pressure when the line pressure set in accordance with a travelling state is equal to or smaller than the first predetermined pressure in a first traveling state in which a rotation primary frequency of a tire and an oil vibration frequency of a control valve correspond to each other.

3. The control device for the continuously variable transmission as claimed in claim 2, wherein the line pressure increase section is configured to increase the line pressure to be greater than the first predetermined pressure when the line pressure is equal to or smaller than the first predetermined pressure when a primary rotation speed is within a predetermined rotation speed range including the first traveling state.

4. The control device for the continuously variable transmission as claimed in claim 3, wherein the line pressure increase section is configured to return the line pressure to the pressure set in accordance with the traveling state when the line pressure is increased, when the oil vibration is not sensed, and when the primary rotation speed is out of the predetermined rotation speed range.

5. The control device for the continuously variable transmission as claimed in claim 2, wherein the line pressure increase section is configured to increase the line pressure to be greater than the first predetermined pressure when the line pressure is equal to or smaller than the first predetermined pressure when a vehicle speed is within a predetermined vehicle speed range including the first traveling state.

6. The control device for the continuously variable transmission as claimed in claim 5, wherein the line pressure increase section is configured to return the line pressure to the pressure set in accordance with the traveling state, when the line pressure is increased, when the oil vibration is not sensed, and when the vehicle speed is out of the predetermined vehicle speed range.

7. The control device for the continuously variable transmission as claimed in claim 1, wherein the line pressure increase section is configured to increase the line pressure to be greater than the first predetermined pressure when the line pressure is smaller than the first predetermined pressure in a second traveling state in which an oil vibration frequency of the line pressure and a torsion natural frequency between the continuously variable transmission and a tire correspond to each other.

8. The control device for the continuously variable transmission as claimed in claim 1, wherein the line pressure increase section is configured to increase the line pressure to be greater than the first predetermined pressure when the line pressure is equal to or smaller than the first predetermined pressure in a third traveling state in which a rotation primary frequency of a tire and a torsion natural frequency between the continuously variable transmission and the tire correspond to each other.

* * * * *